United States Patent [19]

O'Connor

[11] 4,073,998
[45] Feb. 14, 1978

[54] SCRIM/FOIL LAMINATE

[75] Inventor: Terence James O'Connor, St. Catharine's, Canada

[73] Assignee: Bay Mills Limited, St. Catharine, Canada

[21] Appl. No.: 762,210

[22] Filed: Jan. 24, 1977

[51] Int. Cl.$^2$ ............................................. B32B 3/26
[52] U.S. Cl. ..................................... 428/310; 156/79; 156/330; 156/335; 428/285; 428/292; 428/337; 428/414; 428/425; 428/460; 428/920
[58] Field of Search ............... 428/310, 315, 284, 285, 428/292, 288, 293, 313, 337, 414, 425, 460, 920, 921; 156/79, 330, 335

[56] References Cited

U.S. PATENT DOCUMENTS

| | | | |
|---|---|---|---|
| 2,728,702 | 12/1955 | Simon et al. | 428/425 |
| 3,413,180 | 11/1968 | Smith | 428/313 |
| 3,437,551 | 4/1969 | Marshack | 428/311 |
| 3,442,750 | 5/1969 | Wilcox | 428/292 |
| 3,444,024 | 5/1969 | Hillas | 428/292 |
| 3,446,685 | 5/1969 | Goldstone et al. | 428/314 |
| 3,616,134 | 10/1971 | Palenske | 428/292 |
| 3,814,659 | 6/1974 | Nadeau | 428/313 |
| 3,870,594 | 3/1975 | Kudo | 428/285 |
| 3,874,980 | 4/1975 | Richards et al. | 428/337 |

Primary Examiner—William J. Van Balen
Attorney, Agent, or Firm—Morton and Roberts

[57] ABSTRACT

A laminate providing a high strength, low flammability improved moisture vapor barrier for use in producing improved construction panels, to the construction panels which comprise a polyurethane foam interior having a top and a bottom laminate skin bonded thereto, and to the process for producing the construction panels. The laminate is composed of an outer metal skin, e.g., aluminum foil, a scrim and an adhesive tie-coat attaching the scrim to the outer skin. The adhesive tie-coat is carefully selected so that it will react during manufacture of the polyurethane foam to produce the panel and tightly bond the foam to the foil. The tie-coat is preferably a high molecular weight, linear epoxy resin adhesive having free hydroxyl groups which react with the isocyanate, or isocyanurate, used in producing the polyurethane foam.

19 Claims, 3 Drawing Figures

SCRIM/FOIL LAMINATE

BACKGROUND OF THE INVENTION

This invention relates generally to lightweight, high-strength structural panels or laminates and more particularly, to faced polyurethane boardstock of a sandwich-type construction useful to provide desirable thermal insulating properties. Such panels are used on the inside of metal buildings; in inverted roof systems; in conventional built-up roofing; in residential sheathing, replacing plywood or fibreboard; and in the cavity walls of commercial buildings. Its primary function is one of permanent, lightweight, efficient insulation.

Structural panels or laminates are fabricated by bonding thin facings or skins of high tensile and compressive strength to lightweight core materials such as polyurethane foams. The bonded core material in the sandwich stabilizes and stiffens the thin facings, and in present-day interior construction, also frequently is made of a material having fire retardant properties. A variety of materials are presently used to provide facings or skins to cover rigid urethane foam insulation. The basic objectives of such a facing include good tensile strength and puncture resistance such that the facing acts both as a substrate in the foaming operation and as a protective coating during installation; low water vapor permeability value in order that high humidity does not reduce the insulation value of the foam; low flammability of the facing such that a faced board has a lower flamespread and fuel contribution than an unfaced board; good long-term adhesion between the facing and the foam so that the facing remains useful for the lifetime of the insulation; a low coefficient of linear expansion such that stress between the facing and the foam surface does not cause delamination or warpage; a reflective surface; rigidity for foam processing; negligible change in dimensions, up to 350° F., etc. In prior construction panels, difficulty has been experienced in economically constructing the panels with the necessary structural rigidity for satisfactory service and simplified installation, while at the same time retaining all of the above-described desirable properties in the panel structure. The laminate and construction panel of this invention accomplish each of these objectives by using as the facing a metal foil, scrim, tie-coat combination not heretofore known.

Metal, e.g., aluminum, foil has been used heretofore as a facing in forming laminates used in panel construction. To have acceptable puncture resistance and have a low coefficient of linear expansion, it has heretofore been necessary to use heavy hard foil, e.g., 1 mil or 1.5 mil thick and ¼ or ½ hard. These foils are heavy and hard to handle as they puncture and tear easily. While initial adhesion between the foil and a conventional urethane foam can be good, increasing use of highly chlorinated polyols in urethanes and the use of polyisocyanurate systems, both with their inherent friability, has led to the use of a tie-coat on the foil. Originally, a nitrocellulose lacquer was used but more recently urea-formaldehyde modified baking epoxies have been applied to provide a better bonding surface for the urethane foam.

Many attempts have been made to overcome the disadvantages of plain foil facings. Chiefly, these attempts have involved the addition of Kraft paper and, on occasion, a scrim. This type of facing can have acceptable puncture resistance and a low coefficient of expansion which varies glass < paper < foam < foil. However, the flammability of the paper is a definite disadvantage together with the possibility of moisture "wicking" through the paper. Moisture will eventually cause delamination of the facing or degradation of the foam. Several fire retardant paper variations are on the market but their cost is considerably higher than the product of this invention. It is also known to make a construction panel from a urethane foam core continuously laminated to fiberglass reinforced aluminum skins to form a tough, uniform sandwich panel. Such prior art construction panels have substantial advantages over the earlier construction panels in that the urethane-fiberglass reinforced aluminum panels are lightweight, strong and rigid and dimensionally stable while providing high insulating efficiency, both thermal and acoustical. However, the problems relating to the weight and hardness of the foil have not been overcome and difficulties in providing a strong bond between the foil and foam, as well as the scrim, still exist.

The foil/scrim laminate of this invention overcomes these disadvantages in known constructions by use of a scrim to support the foil and by the adhesive tie-coat used to bond the foil and foam so that it reacts with the urethane foam during manufacture to chemically bond or weld to the foam. This invention permits use of substantially thinner, less hard foil and permits reduction in the weight of foil required by some 40 to 115% over the previous use of plain foil. Further, tensile and puncture are greatly improved, and the coefficient of linear expansion of the laminate is less than that of the foil due to the presence of the scrim. The foil/scrim laminate of this invention can be produced using the selected tie-coat material also as a laminating adhesive such that the machine-time to tie-coat the foil is the same as the machine-time used to laminate the scrim to foil.

SUMMARY OF THE INVENTION

The construction panels of the present invention are an improvement over the aluminum-jacketed, urethane foam, construction panels. In the present invention, a fiberglass scrim is bonded directly to a metal, e.g., an aluminum foil jacket, preferably a light-weight, soft foil, by a tie-coat. The foil imparts vapor and moisture resistance to the urethane foam as well as improved reflective properties. The scrim, which is preferably of non-woven material, imparts sufficient strength to the soft foil that it may be used during manufacture of the urethane foam board to support the foam itself. Also, the absence of paper or other flammable materials is desirable as it withstands the temperature required for blowing the foam and meets stringent fire regulations. Paper is preferably not used in the manufacturing process because materials (residual moisture) from the paper can create problems with blowing of the urethane foam. Moreover, the scrim imparts to the finished product added resistance to puncture. A urethane board covered only with aluminum can be punctured by simple handling, referred to as thumbnail puncturing, but a similar board, even if supported by a thinner foil incorporating a scrim, resists such puncture. The scrim used in this invention may be made of various materials, however, fiberglass is preferable because it is non-elastic, has good dimensional stability, and is fire-proof and moistureproof.

The tie-coat of this invention bonds the scrim to the foil and the foil to the foam. The particular adhesive employed is of prime importance. The tie-coat must be water insoluble after cure and bond well to the foil and the scrim. The tie-coat is carefully selected to be reactive with the isocyanate or isocyanurate, used to produce the urethane foam to thereby chemically bind or weld to urethane foam and bind it to the aluminum foil without degradation of the urethane. It is also chosen so that it will keep its strength when hot. Ideally, the adhesive will be of a thermoset type, either an epoxy or phenolic with hydroxyl functionality capable of chemically bonding to the urethane foam through the isocyanate linkage. Preferred tie-coats are the high molecular weight, linear epoxy resins, preferably used in solvent solution.

The tie-coat is applied to the foil and heated to remove solvents, but to remain tacky. The scrim is applied to the tacky tie-coat and attached by passing the laminate through pressure rolls. Thereafter, the temperature of the scrim-foil laminate is reduced so that the epoxy tie-coat is no longer tacky. During this process, the epoxy resin is not reacted.

Subsequently, conventional urethane foam ingredients are applied to the scrim/tie-coat surface on a scrim-foil laminate and, as the mixture begins to react and foam, a second scrim-foil laminate can be applied, again with the scrim side against the urethane foam. Press rolls can be used to restrain the laminate and provide a desired thickness. Heating can be used to increase the reaction of the urethane foam, if desired. In this invention, the linear epoxy resin tie-coat has unreacted hydroxyl groups which react with the isocyanate used to produce the urethane foam and thereby chemically bond the epoxy resin and tie-coat so that the foil-scrim-urethane foam construction panel is an essentially homogeneous product.

Preferably, the scrim is also selected so that it is chemically bonded or welded to the urethane foam during manufacture to become an integral part of the continuous panel. To accomplish this, a scrim of nonwoven fiberglass yarns bonded together at their points of contact by saturating the yarns with a polyvinyl alcohol adhesive coating having free hydroxyl groups is particularly suitable. These free hydroxyl groups react with the isocyanate during the foam making process, to chemically bond or weld the scrim yarns to the urethane foam.

BRIEF DESCRIPTION OF THE DRAWING

For a better understanding of the invention, as well as other objects and further features thereof, reference is to be made to the following detailed description to be read in conjunction with the accompanying drawing where.

DESCRIPTION OF THE INVENTION

Figure 1:
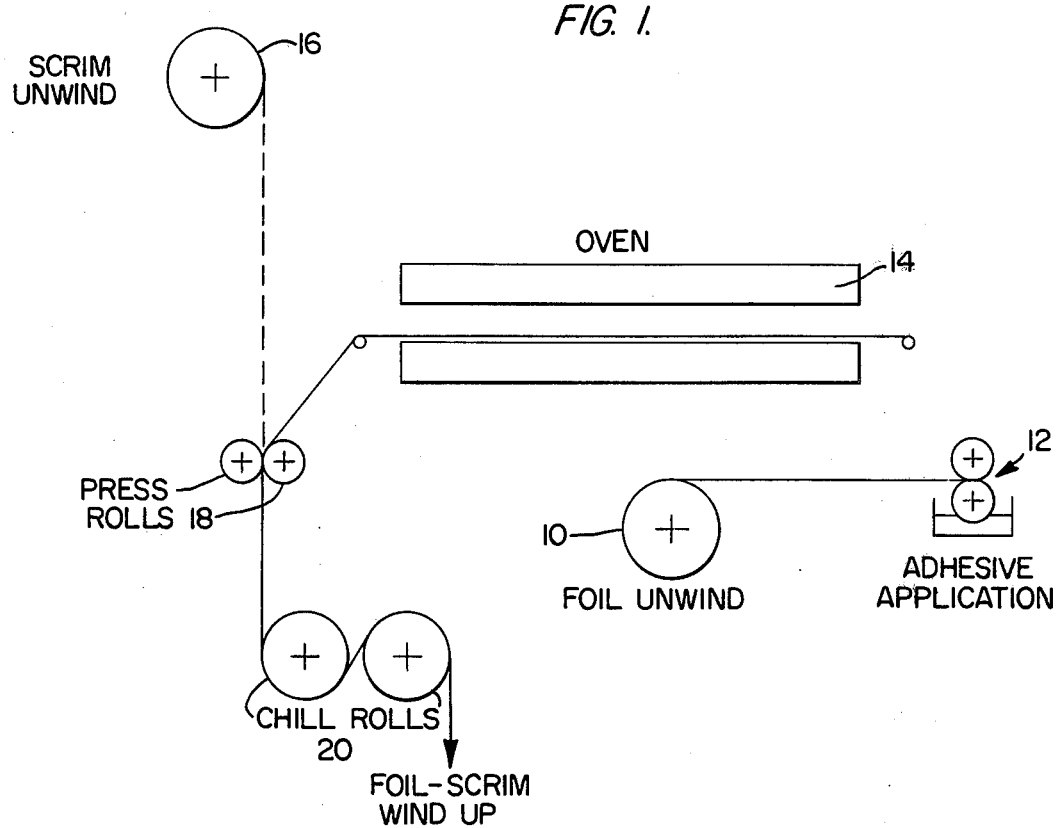
FIG. 1 is a flow sheet setting forth the essential features in the production of the laminate.

Referring now to FIG. 1, a metal foil, such as aluminum, an aluminum alloy, etc., foil, has a tie-coat applied to it. The foil thickness is such that it has sufficient strength, after the scrim is attached, to support its own weight as the urethane foam is produced. Additionally, the thickness of the foil is such that it provides a vapor barrier, i.e., it does not have too many pinholes as can occur during manufacture of very thin foils. Typically, foils of above about 0.5 mil, preferably above about 0.7 mil, in thickness are suitable. Foils having a thickness in excess of about one mil are relatively expensive and savings in economy is lost as the weight of the foil increases. Foil is available in grades from dead soft, such as household foils, which are malleable, to hard foils which do not stretch without breaking. The difference is achieved by annealling. Heretofore, construction panels have used hard foils which are hard to handle without tearing in the manufacturing process and are subject to puncture on installation. An aluminum (or aluminum alloy) foil softer than ½ hard, particularly softer than ¼ hard, e.g., a dead soft foil, and less than 1.5 mil, particularly less than 1 mil thick, is a preferred foil.

The foil is drawn from an un-wind station 10 and tie-coat is applied to the foil by conventional means such as by a rotogravure roll 12. Tie-coats suitable for use in the present invention are adhesives which are organic compounds having unreacted, or free, hydroxyl groups which will react with the isocycanate or isocyanurate used to produce the urethane foam without forming gases. The desirable adhesives have a high hydroxyl functionality, low organic acid functionality, are thermoplastic at temperatures generally above 200° F., or higher; bond well to the foil without corroding the foil, and have a low flammability. The hydroxyl functionality of the adhesive is, in general, sufficient to provide hydroxyl groups in a quantity effective to react and bond the adhesive to the isocyanate or isocyanurate in the urethane foam production step. Suitable adhesives have a hydroxyl number above about 50, particularly above about 100. Preferably, the adhesive will have a hydroxyl number of above about 200 to 250. Ideally, the adhesive will have an acid value of zero. In general, the acid value will be insufficient to cause the formation of gases during manufacture of the construction panel in sufficient quantity to form pockets which prevent adhesion of the foam to the foil. Preferably, the acid value of the adhesive is less than about 1. Most adhesives of the type preferred for use in this invention can be formulated to have acid values of less than 1, such as by cooking with a hydroxyl-containing material. The adhesives should be thermoplastic at the temperature at which the scrim is applied to the foil and not thermoplastic at the temperatures used in the urethane foaming operation. Typically, the urethane foaming operation is carried out at temperatures below about 200°, or 220° F., and the application of the scrim to the foil occurs at temperatures above about 300°, or 350° F. Accordingly, it is generally desired that the adhesive be thermoplastic above about 275° to 300° F., or higher, e.g., preferably about 300° to 350° F., but not thermoplastic at temperatures below about 250° F. The adhesive on the foil should not flash when ignited by a flame and the adhesive should be suitable for application by a rotogravure process, e.g., from solution.

Preferred adhesives for use in producing the tie-coat are high molecular weight, linear epoxy resins, essentially without any crosslinking. Such epoxy resins provide tough, flexible, highly chemically-resistant coatings. Linear epoxy resins are used in the present invention because the resins have unreacted, or free, hydroxyl groups. Typically, the epoxy resins commercially used today are crosslinked with a urea-formaldehyde melamine or a phenolic resin so that the free hydroxyl groups are bonded during curing. This is not desirable in the present invention and the epoxy resin used as a tie-coat is carefully selected and processed to have hydroxyl groups unreacted in the tie-coat after the scrim is applied. Another advantage of having hydroxyl groups present is that the epoxy resin will remain thermoplastic as long as no additional curing agent is provided.

There are several commercially-available high molecular weight, linear epoxy resins which can be used in the present invention. Typically, such resins are glycidyl ether resins which are reaction products of a polyhydric material, e.g., epichlorohydrin, and a polyol, suc as bis-phenol A. The molecular weight of the resin is determined by the reaction conditions and by the ratio of the polyhydric material to the polyol. As the amount of polyhydric material is increased, the molecular weight of the resin will decrease. In the present invention, typically less than two moles polyhydric material will be used per mole of polyol. The epoxy resin in the present invention will generally be supplied in solution form. Commercial epoxy resins suitable for use in this invention are Araldite 488 N-40 of Ciba Geigy, having an average molecular weight of 17,000 and a Hydroxyl Number of 290, and D.E.R. 684-EK40 of Dow Chemical. Epoxy resins are commercially available in solution containing about 40% solids. Typical solvents include methyl ethyl ketone, cellosolve acetate, etc., with xylene and toluene being common diluents when adjusting the viscosity and solids content. In the present invention, an epoxy resin solution of about 15 to 20% solids is suitable.

The amount of adhesive applied to the foil to provide the tie-coat is, in general, an amount sufficient to provide an essentially continuous coating on the foil to seal any pinholes that might be in the foil, as well as bind the scrim to the foil. Preferably, the minimum amount of adhesive to give the desired adhesion is used. Typically, from about one and one-half to two pounds per ream (dry) of foil of the adhesive, up to about ten pounds per ream (dry), particularly about three to five pounds per ream (dry), of the adhesive will be used.

After application of the tie-coat, the foil and tie-coat are passed through a heating zone which can be oven 14, or heating rolls, maintained at a temperature sufficient to dry the tie-coat and remove essentially all the solvent. The adhesive, e.g., epoxy resin is, as discussed above, selected to be tacky at this elevated temperature; however, there should be no reaction of the adhesive due to heat. It is possible, if too high a temperature is used, to, for example, crosslink an epoxy resin and react the hydroxyl groups through crosslinking. Temperatures on the order of about 300° to 450° F. at foil residence times of approximately 5–10 seconds in the oven are generally sufficient to evaporate the solvent without reacting the adhesive, particularly an epoxy resin, although this is dependent upon the particular solvent and adhesive being used and the percent solids of the adhesive.

The scrim is applied to the tacky tie-coat from a wind-up stand 16 and passed through a series of press rolls 18 which press the scrim into the tie-coat, preferably without deforming the foil. Preferred press rolls include one Teflon-coated roll having Shore Hardness of less than 60D and one heated roll, to heat the foil if necessary to keep the adhesive tacky. The scrim is applied while the foil is still hot and the adhesive is thermoplastic, i.e., tacky.

Subsequent to the aplication of the scrim, the scrim-foil laminate is passed over chill rolls 20, which reduce the temperature of the foil so that the adhesive is no longer tacky, e.g., to about 125–130° C. The laminate can then be rolled up to provide an intermediate product in the preparation of the construction panels in accordance with this invention.

Water-soluble, essentially neutral, phenolic resins are also suitable for use in this invention, such as the IB916 resin of Reichhold Chemical Company. However, the epoxy adhesive is preferred since the phenolic product is more brittle and, if any residual water remains on the foil, it can react in the urethane foaming process. When a phenolic resin adhesive is used, since these resins are thermosetting, the scrim will be applied to the adhesive tie-coat while the tie-coat is wet and the tie-coat will then be dried. A convenient way to apply the scrim is to marry the tie-coated foil and scrim over a heated roll to cure the resin. Roll pressures should not be so high as to crush the scrim.

The scrim can be made from threads or yarns of any material having the desired strength which are non-flammable and very dimensionally stable, particularly yarns which are stable to temperature changes. Fiberglass fibers are generally preferred for most applications since fiberglass is non-flammable and provides a finished sheet typically having superior tensile strength, elongation and modulus characteristics as the foil without the reinforcing web. The size of the yarns, or threads, in the scrim, or reinforcing web, can vary considerably from fine threads to very heavy yarns. The strength of the yarns should be sufficient such that the combined yarn-foil laminate produced from a low-strength foil, e.g., a soft foil, can be drawm through the foaming operation without deformation of the laminate. Any dimensional change in the yarn as the laminate is pulled through the foaming operation will wrinkle and deform the foil. Preferably, the scrim is made from fiberglass yarns having above about 4 pounds tensile to break per yarn end. In the case of unsized yarns or scrims, the particular yarn being used can affect the amount of adhesive tie-coat, since, if the yarn absorbs the adhesive tie-coat, it will be necessary to increase the amount of adhesive tie-coat applied to the foil to wet the yarns and still provide the desired continuous coating of tie-coat on the foil.

The arrangement of the reinforcing yarns and the mesh size and shape of the scrim are dependent upon end use and handling requirements. Typically, the scrim will have ¼ to 20 threads per inch in each direction. For use in this invention, non-woven scrims having ½ to 10 threads per inch in each direction are preferred. Yarns arranged in only one direction provide reinforcement generally only in that direction. The precise shape of the mesh of the scrim is, of course, selected in accordance with the desired end use and can be rectangular, square, diamond, etc. Also, the scrim can use multiple, closely adjacent, threads in an open mesh, such as pairs of threads each inch in each direction.

Preferably, the scrim is of the type produced by the process described in French Pat. No. 1,208,968. In this process, a non-woven fabric is produced from several yarns and passed through an adhesive which is adapted to bind the yarns together. The selected adhesive can be applied to the yarns of the scrim before it is produced or after the scrim is produced by passing the yarns or scrim through a solution of the adhesive and drying the same. Bonding can be accomplished, for example, by heating. The scrim can also be of other types including woven materials and materials made by superimposing a layer of weft on a layer of warp threads, or vice versa. Woven scrims, however, typically have entrapped air in the knots of the weave, particularly when they are not sized, and water is frequently found in the yarns or knots. These pockets of air and water can prevent adhesion of the tie-coat to the foil and the foil to the foam.

The preferred adhesives to be used, particularly on the non-woven scrim, are adhesives which also will react with the isocyanate used to produce the urethane foam in the foaming process. In general, the amount of adhesive placed on the scrim yarns is that sufficient to bond the maximum fiber surface. When the adhesive is also used to bond the reinforcing yarns to the foam, the amount of adhesive should be sufficient to bond the fibers to the foam without destroying the bonding between the individual yarns in the reinforcing web. While there is no maximum amount of adhesive, realistically, there are several physical limitations such as the bulk of the material and it is preferred to use the minimum amount necessary. When the preferred scrim, which is a non-woven material, is used, an amount of the adhesive is applied to the yarns effective to provide the bond between the scrim yarns is used. This amount will vary with the size of the yarn and, in general, with finer yarns more adhesive must be used. Typically, about 5% to 10% by weight adhesive should be on the preferred scrim for yarns of about 37 1/0 fiberglass and about 10 to 15% by weight adhesive should be used for yarns of 150 1/0 and 75 1/0 fiberglass. Therefore, the particular amount of adhesive used in a given product will be determined by the specific reinforcing web used. Amounts of adhesive from about 5% by weight, or even less, based on the reinforcing web yarn weight, to 100%, or 150%, or more, can generally be used satisfactorily. The scrim should not contain any water as water will react with the isocyanate in the urethane foaming operation to produce carbon dioxide and from cavities in the construction panel which prevent bonding of the yarn to the foam at this point.

Preferred adhesives include polyvinyl alcohol adhesives, which are commercially available in a wide range of water solubilities and hydroxyl functionality. Polyvinyl alcohol adhesives generally are preferred, as they exhibit excellent adhesion to urethane foam. Polyvinyl alcohol is a term which includes all resins made by hydrolysis of polyvinyl acetate and the properties of these resins vary according to the molecular weight and the extent of hydrolysis. Everything else being equal, the differences in the degree of hydrolysis govern the ease with which the polyvinyl alcohol will dissolve in water, i.e., the lower the percent hydrolysis, the greater the solubility. On the other hand, the lower the degree of polymerization, the longer it takes for the polyvinyl alcohol to turn tacky. Completely hydrolyzed polyvinyl alcohol (4% residual acetate content or less) generally is insoluble in cold water and begins to dissolve only when the water temperature is raised above 75° C. (167° F.). Polyvinyl alcohols having a low degree of hydrolysis, 80% and below, generally are not soluble in hot water but are soluble in cold water. In addition to polyvinyl alcohols of different solubilities due to differences in degree of hydrolysis and degree of polymerization, there are also commercially available a wide variety of polyvinyl alcohol adhesives containing starch, clay, and other extenders, all of which provide a wide range of properties, including solubility.

Figure 2:
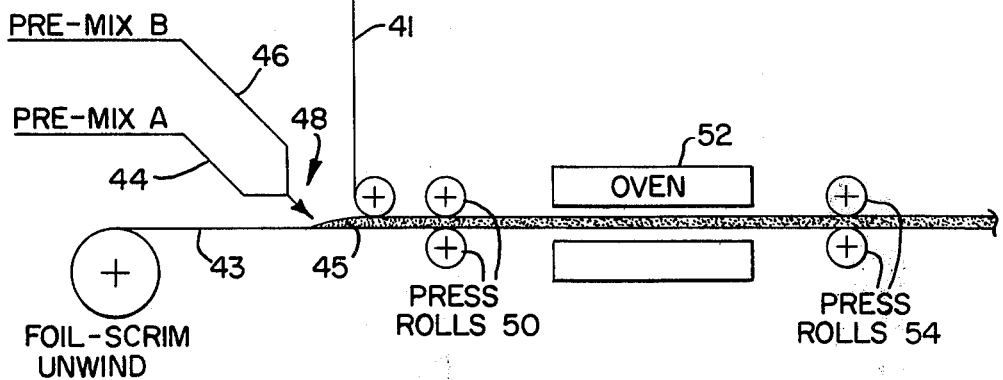
FIG. 2 is a flow sheet setting forth the essential features in the production of a construction panel.

In the final portion of the process by which the construction panel of the present invention is made, see FIG. 2, two of the scrim-foil laminates can be used, each arranged so that the foil is the outside skin of the construction panel. In the present instance, a urethane foam is formed between the two laminates which are drawn from wind-up stands 40 and 42. Generally, rigid urethane foams are the reaction products of hydroxyl-containing materials and isocyanates or isocyanurates. The hydroxyl-containing material employed can be a polyester, such as adipic acid polyester, or may, more generally, be a polyether, such as polypropylene glycol or polypropylene glycol which has been modified with a triol.

Today's rigid foam production is based primarily on what is described as a "crude" (unpurified) MDI, 4,4'-diphenylmethane diisocyanate, so-called "polymeric" isocyanates. This group of isocyanates consists of undistilled products derived from aniline-formaldehyde condensation; they are chemically related to pure MDI. Idealized structures of these materials are shown:

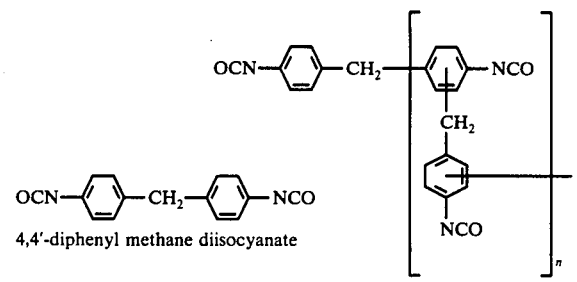

4,4'-diphenyl methane diisocyanate

The increased emphasis on non-combustible components by the building industry has helped increase the need for more thermally stable, less combustible products from the urethane industry. This has led to the further development of isocyanurate (or trimer) foams.

While rigid urethane foam is made by the reaction of an isocyanate with a polyol, isocyanurate foams are formed by cyclization of isocyanate groups into a six-membered ring:

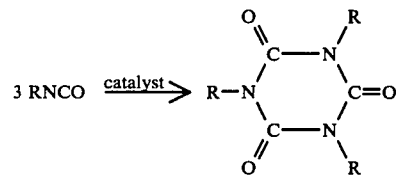

In addition to a polymeric isocyanate, specific catalysts, modifying agents which might include glycols, polyethers or polyesters, surfactants, and blowing agents are usually present in making a isocyanurate foam. Early isocyanurate foams were friable or brittle foams which exhibited poor adhesion to conventional facings.

The most commonly used polyols, particularly in isocyanate-based foams, are the polyethers, such as those based on propylene oxide adducts to various polyfunctional alcohols or amines such as glycerol, pentaerythritol, trimethylolpropane, sorbitol, alpha-methylglucoside, sucrose, and ethylene-diamine. These polyethers have predominantly secondary hydroxyl groups unless they have been deliberately terminated with ethylene oxide. Polyesters have also been used as the polyol component for rigid foams. However, owing to their higher cost, they are gradually being replaced by the polyethers.

Halogenated hydrocarbons, such as trichlorofluoromethane, are generally used as blowing agents in rigid foam. Water can also be used, utilizing its reaction with isocyanate to form carbon dioxide as the blowing agent. Other lower-boiling solvents, such as dichlorofluoromethane, which is especially useful in the "frothing process," can also be used.

In the halogenated solvent-blowing systems, amine catalysts such as diaza (2.2.2)-bicyclooctane (triethylenediamine) or 1,2,4-trimethylpiperazine used in combination with tin compounds (such as dibutyltin dilaurate or stannous octoate) are used. In water-blown systems, the usual catalysts are tertiary amines, such as N-ethylmorpholine, triethylamine, or substituted ethanolamines.

Surfactants are also used in foaming formulations to impart stability to the foam system and regulate the cell size. The most common surfactants used in urethane foams are water-soluble silicones, such as polyoxyalkylene-polydimethylsiloxane block copolymers. These usually give extremely fine-celled uniform foams of high closed-cell content. For rigid foams used in construction, the need for flame retardance has been met by incorporating inorganic compounds (such as metal oxides, metal soaps, metal sulfates, phosphates, borates, titanium compounds, etc.) or organic compounds containing phosphorous or chlorine.

Typically, urethane foams are made from commercially available pre-mixes which are designed to give a foam of a preselected free rise density at a preselected rise time.

The two pre-mixes, are an "A" mix which provides the isocyanate or isocyanurate, for example, crude MDI, and a "B" mix based upon the polyol.

Figure 3:
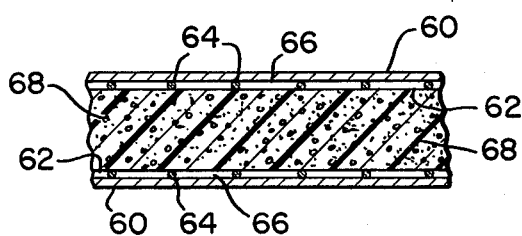
FIG. 3 is an enlarged view of a portion of a construction panel.

In the present invention, the "A" and "B" mixes can for example, be selected to provide a free rise density of 2 pounds per cubic foot in a rise time of about 1 minute. Additional catalyst can be added to adjust the rise time and obtain the best adhesion. The "A" and "B" mixes are carried by heated hoses 44 and 46 to a spray head 48 and impinged on each other at about 180° C., typically in a 1:1 ratio by weight. The two liquids are intimately mixed and then sprayed across the foil-scrim laminate 43. Reaction occurs between the MDI and polyol to produce a foam on the foil-scrim laminate 41 and the foam 45 begins to rise. The second scrim-foil laminate 41 is applied on top of the foam as it begins to rise, while the top of the foam is still tacky and the panel, now comprising the two foil-scrim laminates and foam, is passed between press rollers 50 which restrain the foam to provide the desired thickness, e.g., typically one-fourth to three inches. If desired, the press rollers can be heated, or the laminate can be separately heated, e.g. by oven 52, to increase the foaming reaction. Additional press rolls 54 can be used as desired to restrain the laminate to the desired thickness. Upon completion of the reaction, the desired product, see FIG. 3, has been produced. As shown in FIG. 3, the construction panel comprises two laminates each having an outer skin 60 of aluminum foil and a scrim 62 composed of yarns 64 and 66 perpendicular to each other which are separated by a foam center 68. The foil, scrim and foam center are bonded together as described above so that the panel is an essentially homogeneous product.

The following examples are illustrative of this invention. All parts and percentages are by weight unless otherwise indicated.

The following examples serve to further illustrate the invention:

EXAMPLE I

A foil/scrim laminate was prepared on 12 inches wide pilot plant equipment by coating both the scrim and 0.7 mil soft aluminum foil with a 10% water solution of IB916 phenolic resin powder from Reichhold Chemical. This resin requires 15 seconds cure time at 150° C. The scrim and foil were married over a steam heated (150° C.) can, running at 10 feet per minute with 4 feet of contact on the can. The dried, cured laminate was subjected to 500 psi pressure on a chilled steel/rubber nip and wound up. The final product had an embossed appearance and samples performed well in adhesion to urethane foam and under humid aging.

EXAMPLE II

A production line run was conducted on an Inta-Roto laminator having a 40-foot long arc-type single pass oven with a heat capacity of 5 million BTU using 54 inches bright one side 0.7 mil soft aluminum foil and 53 inches 4 × 4 (yarns/in.) fiberglass scrim. The scrim was made of 150 1/0 FG yarns (4 lbs. tensile/yarn end) bonded together by a polyvinyl alcohol adhesive having a solids content of 9% and comprised of 91.03% water, 0.23% antifoaming agent, 0.43% urea and 8.31% Elvanol 71-30, a water-soluble polyvinyl alcohol adhesive of hydrolysis, mol %, 99.0–99.8%, and saponification number 3–12. An adhesive tie-coat, Araldite 488E-32 brought down to 20% T.S. with toluene/cellusolve acetate, was applied at the lacquer head using a rotogravure roll giving 6.5 lb. per ream wet (1.3 lb. per ream dry). Araldite 488E-32 is a high molecular weight linear epoxy polymer having a high hydroxyl functionality. It is supplied as a solution in cellusolve acetate containing 32% T.S. and has a viscosity, Gardner-Holdt, 25° C., Y; color, Gardner, 3; density, 25° C., 1.03; flash point, 60° C. and hydroxyl number of about 290.

The scrim made contact with the foil shortly after it left the coating roll. Although tensions were varied on the foil and scrim, it was run at 300° F. and 300 feet per minute with continual tension adjustment. Some blocking occurred due to entrapment of cellusolve acetate in the dried epoxy film but four hundred yards of good material were produced. This material was run through a commercial urethane foam process, normally used to run with plain foils at ¼ and ½ hard, and acceptable product was obtained without adjustment to this equipment. This process run was repeated with the scrim supporting the foil through the oven. Again, good product was obtained at approximately 2–3 lb. adhesive per ream dry.

EXAMPLE III

A laminate was produced by the process shown in FIG. 1 using 54 inches, 0.7 mil soft aluminum foil and a scrim as described in Example II. The polyvinyl alcohol adhesive was applied in an amount of about 10% wt. of the fiberglass. The scrim was heated to remove water before the PVA adhesive was set. Araldite 488E-32, described in Example II, maintained at about 15% T.S. was applied at a rate of about 3 lbs. per ream (dry) of foil. The foil was passed through an oven (350–450° F., 5 to 10 seconds dwell time) to remove solvents and the scrim was nipped at the oven exit while the epoxy was still tacky. The laminate was then chilled to remove the tack. The laminate was then used in a conventional urethane foam installation as the skin for both sides of a construction panel 1 inch thick. Both isocyanate and isocyanurate foams were run to produce panels and the panels were acceptable under commercial standards.

EXAMPLE IV

Samples made in accordance with Example III were prepared using an isocyanurate foam with different types of aluminum foil and has the following characteristics:

|  | 0.7 mil hard foil/scrim | 0.7 mil soft foil/scrim | 1.5 mil hard foil |
|---|---|---|---|
| Tensile ASTM D1117-63 (lb/in width) | foil 16.2<br>scrim 16<br>Total 32.2 | foil 7<br>scrim 16<br>23 | 34.8 |
| Trapezoid tearing load test ASTM D1117-63 | over 4 lb. | over 4 lb. | 0.25 |
| Mullen burst test ASTM D1117-63 (psi) | over 40 lb. | over 40 lb. | 29.0 |
| Thumbnail puncture on foam board (subjective) | does not puncture | does not puncture | punctures easily |

Laminate/foam/laminate composite samples were made using a 1 inch thickness of regular 2 lb/cu. ft. urethane foam and cut in 2 ½ inches × 9 inches sample sizes. Each end of the sample was restrained and a load was applied in the upward direction. The applied load necessary to break the foam board (a clean break through the upper laminate and through the foam core) and the vertical deflection at which the break occurred are shown below. As a comparison, non-laminated core foam fractured at 14 lb/in width/1 inch thickness with a deflection of 1.1 in.

| Foam laminate resistance to break (*) | Core foam | Core foam laminated to scrim/soft foil 0.7 | Core foam laminated to 30 lb. FRKraft/ 0.35 mil hard foil |
|---|---|---|---|
| lb/in. width/1" foam thickness | 14 | 22.4 | 20.0 |
| Deflection of sample prior to break | 1.1" | 0.75" | 0.5" |
| Ratio of smoke generation in Monsanto 2 ft. tunnel test | 1 : | ½ : | 1 |

Heavy plain foil 1 mil and 1.5 mil facings add to the flamespread (increase of 10–15 units) and smoke ratings over non-laminated core foams, whereas lighter foils (0.7 mil and less) can increase the flamespread by zero to 5 units (with correspondingly less smoke). This phenomena is believed to be caused by entrapment of combustible decomposition gases behind the foil face. The thicker the foil, the longer the gases are trapped such that when the foil melts (660° C.) and gives way, a flash of gases dramatically increases the flamespread. The softer foil, with less tensile, reduces this problem over a harder foil of the same gauge.

EXAMPLE V

The following urethane system was used to make 1 inch samples of construction panels using the foil/scrim laminates of Example III:

Pre-Mix "A" was Rubinate M, of Rubicon Chemicals.

Pre-Mix "B" had the following composition:

| Material | Equivalent Weight | Supplier | % |
|---|---|---|---|
| Voranol RN 490 (Polyol) L-530 | 114.5 | Dow Chemical | 76.17 |
| (Silicone Surfactant) | — | Union Carbide | 1.01 |
| Dabco R-8020 (Catalyst) | — | Houdry | 0.62 |
| Dabco 33LV (Catalyst) | — | Houdry | 0.62 |
| Deionised Water | 9.0 | | 0.18 |
| Freon 11 | — | DuPont | 21.40 |
| | | | 100.00 |

When Pre-Mixes "A" and "B" were mixed in a 1:1 ratio (by weight), with Part A at 90° F., Part B at 70° F., a cream time of 30± 5, gel time of 80± 5 and a rise of 120± 10 seconds was obtained. The final total percentage water in Part B was adjusted to 0.25%.

Acceptable construction panels were obtained by applying the pre-mixes to one laminate and applying a second laminate to the foam as it rises and while it is still tacky.

It is claimed:

1. A laminate providing a high strength, low flammability, moisture vapor barrier, especially adapted for use in polyurethane foam construction panels comprising
   a metal foil;
   an adhesive tie-coat coating one surface of said foil, said tie-coat comprising an organic adhesive compound having a high hydroxyl functionality, low organic acid functionality, low flammability, and which is thermoplastic at temperatures above about 200° F.; and
   a scrim attached to said foil by the tie-coat, said scrim being made of yarns which are non-flammable and dimensionally stable.

2. A laminate as defined in claim 1, wherein said scrim comprises non-woven fiberglass yarns bonded together at the points where they touch by a polyvinyl alcohol adhesive coating applied to said yarns.

3. A laminate as defined in claim 2, wherein said metal foil is an aluminum foil softer than ½ hard having a thickness in excess of 0.5 mil.

4. A construction panel comprising at least one laminate as defined in claim 1 having applied to the tie-coated surface a polyurethane foam, said polyurethane foam being prepared from a hydroxyl containing material and an isocyanate material comprising an isocyanate or isocyanurate, said isocyanate material and the hydroxyl groups of said organic adhesive compound having been reacted to chemically bond the foam and compound and thereby bonding the foam to said foil.

5. A construction panel comprising at least one laminate as defined in claim 2 having applied to the tie-coated surface a polyurethane foam, said polyurethane foam being prepared from a hydroxyl containing material and an isocyanate material comprising an isocyanate or isocyanurate, said isocyanate material and the hydroxyl groups of said organic adhesive compound having been reacted to chemically bond the foam and compound and thereby bonding the foam to said foil, said polyvinyl alcohol containing hydroxyl groups which have been reacted with said isocyanate material to chemically bond with the foam to weld the scrim and foam.

6. A process for producing a laminated construction panel comprising a polyurethane foam interior of a desired thickness having on at least one surface thereof a laminate comprising a metal foil, a scrim and a tie-coat and providing a high strength, low flammability, moisture vapor barrier, comprising
coating a surface of said metal foil with said tie-coat;
attaching said scrim to the tie-coated surface while said tie-coat is thermoplastic;
producing on said tie-coated surface a polyurethane foam of said desired thickness, said polyurethane foam being prepared from polyurethane foam producing hydroxyl containing materials and an isocyanate material comprising an isocyanate or isocyanurate;
said tie-coat comprising an organic adhesive compound having a hydroxyl functionality sufficient to provide hydroxyl groups in an amount effective to react with said polyurethane foam components during manufacture of the foam and bond the foam to the foil, a low organic acid functionality, low flammability and which is thermoplastic at temperatures above 200° F.

7. A process as defined in claim 6 wherein said scrim comprises non-woven fiberglass yarns bonded together at the points where they touch by a coating of a polyvinyl alcohol adhesive applied to said yarns in an amount sufficient to bond said yarns, said polyurethane foam being prepared from a hydroxyl containing material and an isocyanate material comprising an isocyanate or isocyanurate, said isocyanate material and the hydroxyl groups of said organic adhesive compound having been reacted to chemically bond the foam and compound and thereby bonding the foam to said foil, said polyvinyl alcohol adhesive containing sufficient hydroxyl group to react with said isocyanate material and chemically weld the scrim to said foam without destroying the bond between contacting yarns.

8. The process of claim 6 wherein said organic acid value is insufficient to cause the formation of gases in the manufacture of the polyurethane foam.

9. The process of claim 6 wherein the organic adhesive compound is thermoplastic at the temperature at which the scrim is applied to the foil and not thermoplastic at the temperature of the polyurethane foam production.

10. The process of claim 6 wherein the organic adhesive compound is a high molecular weight, linear epoxy resin adhesive.

11. The process of claim 6 wherein said tie-coat is applied to said foil in an amount sufficient to coat the surface thereof and chemically bond the polyurethane foam to the foil.

12. The process of claim 7 wherein the fiberglass yarns of the scrim have above about four pounds tensile to break per yarn end and the scrim has about ¼ to 20 yarns per inch in each direction.

13. The process of claim 12 wherein the amount of polyvinyl alcohol is in excess of about 5% by weight based on the weight of said yarns.

14. The process of claim 6 wherein the foil is an aluminum foil having a thickness above about 0.5 mil.

15. The process of claim 14 wherein the aluminum foil is softer than ½ hard.

16. The process of claim 6 wherein the hydroxyl functionality of said organic adhesive compound is in excess of about 50 and the organic acid value is less than about 1;
said organic adhesive compound is thermoplastic at temperatures above about 200° F. and not thermoplastic at temperatures above about 300° F., and said organic adhesive compound does not flash when ignited by a flame.

17. The process of claim 16 wherein said tie-coat is applied to the foil in an amount of from about 1.5 pounds per ream (dry) of foil to about 10 pounds per ream (dry) of foil.

18. The process of claim 17 wherein the foil is an aluminum foil softer than ½ hard and having a thickness between about 0.5 mil and 1 mil.

19. The process of claim 18 wherein said fiberglass yarns having above about four pounds tensile to break per yarn end and has ¼ to 20 yarns per inch in each direction, said amount of polyvinyl alcohol adhesive being in excess of about 5% by weight based on the weight of said yarns.

* * * * *